United States Patent [19]

Narron

[11] Patent Number: 5,551,619
[45] Date of Patent: * Sep. 3, 1996

[54] TREAD STRIP CENTERING GUIDE FOR TIRE BUILDING MACHINES

[75] Inventor: Jessie R. Narron, Lucama, N.C.

[73] Assignee: Bridgestone/Firestone, Inc., Akron, Ohio

[*] Notice: The term of this patent shall not extend beyond the expiration date of Pat. No. 5,524,804.

[21] Appl. No.: 388,705

[22] Filed: Feb. 14, 1995

[51] Int. Cl.[6] ................................................. B23Q 15/00
[52] U.S. Cl. .............................................. 226/17; 226/198
[58] Field of Search ................................ 226/17, 19, 189, 226/198, 179, 44

[56] References Cited

U.S. PATENT DOCUMENTS

| | | | |
|---|---|---|---|
| 1,711,074 | 4/1929 | Winkle | 156/405.1 |
| 2,947,057 | 8/1960 | Meagher, Jr. et al. | 26/66 |
| 3,170,829 | 2/1965 | Batten | 156/405 |
| 3,269,627 | 8/1966 | O'Brien | 226/179 |
| 3,684,144 | 8/1972 | Boudouris et al. | 226/114 |
| 3,896,983 | 7/1975 | Weinguni | 226/198 |
| 3,974,953 | 8/1976 | Klose | 226/198 X |
| 4,049,486 | 9/1977 | Henley | 226/17 X |
| 4,212,422 | 7/1980 | Rauchfuss, Jr. et al. | 226/196 |
| 4,750,660 | 6/1988 | Kamimura | 226/199 |
| 4,961,813 | 10/1990 | Bailey | 156/406.4 |

FOREIGN PATENT DOCUMENTS

DT2844528  4/1979  Germany ........................... 226/17

Primary Examiner—Daniel P. Stodola
Assistant Examiner—Emmanuel M. Marcelo
Attorney, Agent, or Firm—Carmen S. Santa Maria

[57] ABSTRACT

An apparatus which guides tire tread strip material toward a tire-building drum and maintains the strip centered by compensating for minor variations in strip width. A pair of guide rails are adjustably mounted on a support housing and contain strip-engaging rollers which form a guide path for the tread strip therebetween. A panograph linkage is mounted on the housing and connects the guide rails for simultaneous movement of the rails toward and away from each other. A biasing mechanism, such as a spring or weight, biases the rails toward each other and the rollers into guiding engagement with the edges of the tread strip, and enables the guide rails to automatically move inward or outward to compensate for variations in tread width. The guide rails are freely movably mounted on spaced bearing rods for transverse adjustment with respect to the travel of the tread strip. The guide rails may be individually pivotally mounted on support brackets to adjust the angle of contact of the guide rollers with a tread strip.

13 Claims, 6 Drawing Sheets

TREAD STRIP CENTERING GUIDE FOR TIRE BUILDING MACHINES

BACKGROUND OF THE INVENTION

1. Technical Field

The invention relates to a guide apparatus, and in particular, to an apparatus for guiding strip material to a tire-building drum. More particularly, the invention relates to a guide apparatus for maintaining a tread strip centered as it moves through the apparatus for accurate placement and alignment of the tread strip on an adjacent tire-building drum.

2. Background of the Invention

Apparatus, as is that of the present invention, is generally referred to in the tire-building art as a "server" or "guide", and typically includes a flat table or plate which is positioned in operative position with a tire-building drum. On the upper surface of the guide plate or table are transversely movable guide members or fences selectively adjustable to various predetermined spacings established by the width of the particular flat tire components being applied to the drum.

Heretofore, these fences or guide members have been simultaneously moved transversely to the surface of the guide plate by various mechanisms. For example, in U.S. Pat. No. 1,711,074, a shaft and drive sprocket has been provided with detente fingers extending radially of the shaft and selectively engaged in a spring detente fixed to a support plate. Manual rotation of the sprocket shaft would move from one detente position to the next, thus establishing a desired number of preselected locations for the spaced guide members.

U.S. Pat. No. 3,170,829 shows another guide apparatus for a tire-building machine which uses a chain drive linkage for setting the spacing between the guide rails or fences. Coil springs are used to bias the guides away from each other and toward an outward position out of engagement with the strip material being conveyed therebetween.

U.S. Pat. No. 3,269,627 shows another type of guide mechanism for hot strip material in which the two fences and guides are moved by a piston cylinder assembly and a rotatable shaft for adjusting the position between the two guides.

U.S. Pat. No. 4,750,660 discloses another guide apparatus for sheet material in which the guide rails are positioned by means of a rotatable threaded shaft and guide blocks, and a positioning cylinder for setting the desired spacing between the rails.

U.S. Pat. No. 4,961,831 shows a guide mechanism for sheet material for a tire-building drum in which the spacing between the guide members is achieved by a drive belt and drive motor.

Although these prior guide devices provide for the accurate setting of the guide fences or rails, they do not provide for the automatic simultaneous adjustment of the guide rails in order to compensate for increased or decreased strip widths which does occur in many strip components while being fed to a tire-building drum. This can result in the moving strip being moved off-center, and, therefore, inaccurately delivered to the tire-building drum. As the complexity of the tire structure has increased, the necessity for extreme accuracy in positioning the guide members or guide rails for delivery of the flat strip component has become more critical, especially when used with automated tire-making equipment.

Therefore, the need exists for a guide apparatus to be used primarily for a tire building drum which will automatically compensate for variations in strip width as it moves toward the tire-building drum and through the server to maintain the strip centered in the server to provide accurate delivery to the tire-building drum.

SUMMARY OF THE INVENTION

Objectives of the invention include providing an improved guide for tire-building machines which will maintain the strip component centered in the server, irrespective of minor variations in tread width, by automatically moving the guide rails and associated rollers toward and away from the strip simultaneously on both sides of the strip to maintain the strip centered on its delivery axis.

A further objective of the invention is to provide such a guide in which the automatic width compensation feature can be incorporated easily into existing servers without material alterations, reducing the cost to retrofit existing guide apparatus and requiring a minimum number of additional components in the construction of new tire-building servers or guide apparatus.

A still further objective of the invention is to provide such a guide in which the automatic compensating feature is provided either by a spring-biasing force or a weight.

Another objective of the invention is to provide such a guide in which a stop is provided on the apparatus to prevent damage to the guide mechanism when a strip is not being conveyed between the guide rails.

Still another objective of the invention is to provide such a guide which uses a panograph linkage mechanism to simultaneously move both guide fences or rails inwardly or outwardly equally with respect to the centerline of the guide to maintain the strip being conveyed therebetween centered regardless of the strip width.

These objectives and advantages are obtained by the guide for a tire-building machine of the present invention, the general nature of which may be stated as including a support housing having a longitudinally extending material path therethrough; a pair of spaced longitudinally extending guide rails connected together for simultaneous movement toward and away from each other transversely with respect to the longitudinal path of the support housing; guide means mounted on each of the guide rails for guiding engagement with a strip of tire-building material moving longitudinally between the guide rails; and biasing means operatively engageable with the guide rails for biasing the rails toward each other and for moving the guide means into engagement with a strip of material moving between said rails to maintain said strip centered within the housing as it moves therethrough.

BRIEF DESCRIPTION OF THE DRAWINGS

Preferred embodiments of the invention, illustrative of the best modes in which applicant has contemplated applying the principles, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENT

Figure 1:
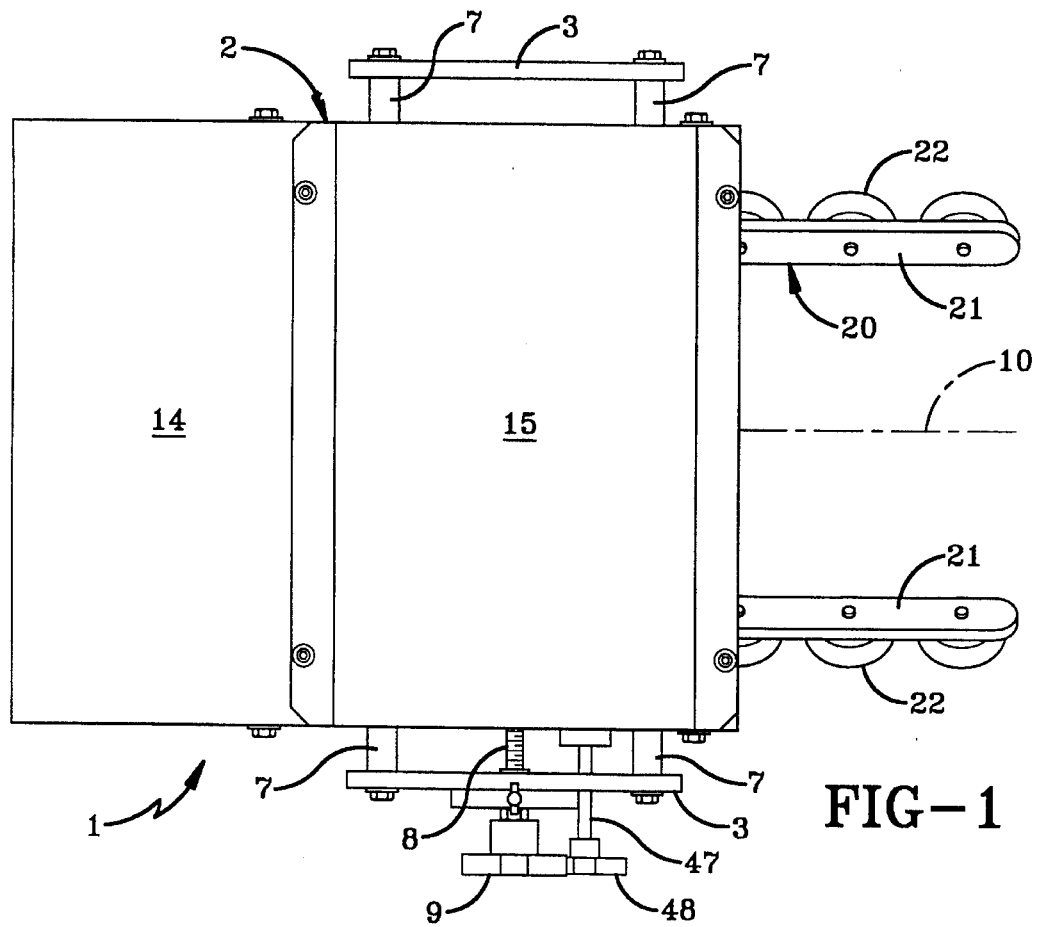
FIG. 1 is a top plan view of a first embodiment of the tread guide apparatus of the present invention.
Figure 2:
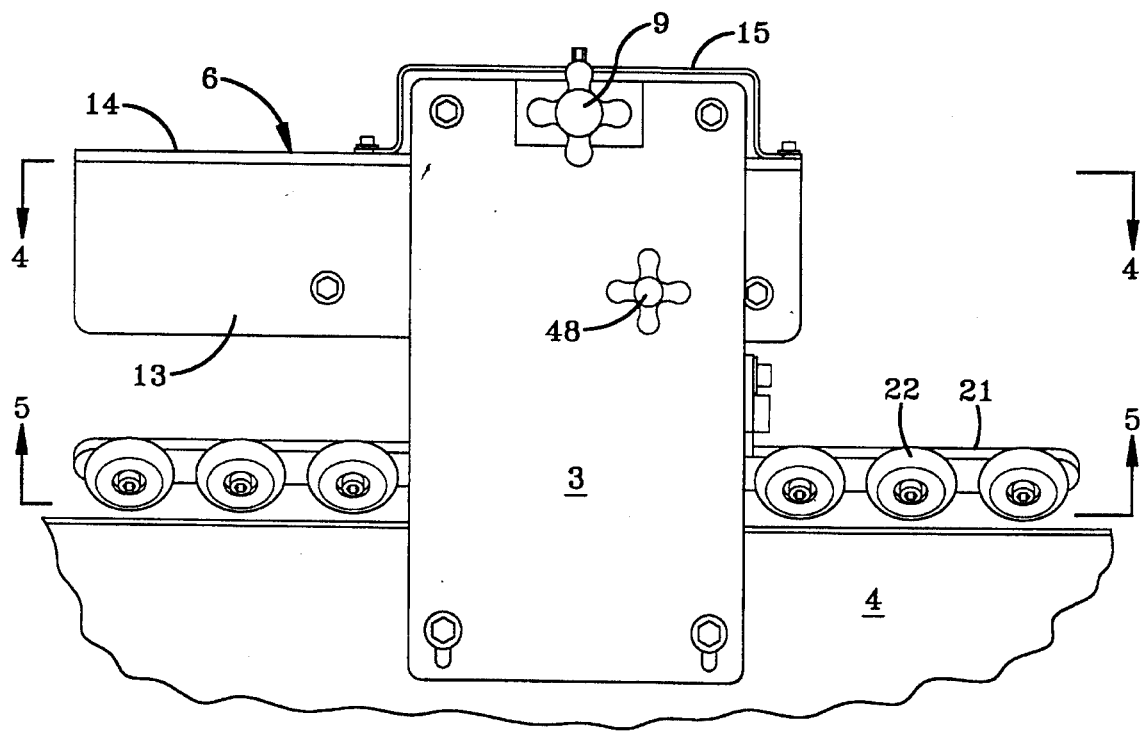
FIG. 2 is a partial side elevational view of the tread guide of FIG. 1 with portions removed.

A first embodiment of the tread guide apparatus of the present invention is indicated generally at 1, and is shown in FIGS. 1–5. Apparatus 1 includes a support housing, indicated generally at 2, which includes a pair of spaced parallel side frame members 3 which are attached to or mounted adjacent a server or tread support guide table 4, and extend vertically upwardly therefrom. A subframe assembly, indicated generally at 6, is adjustably mounted on and extends between side frame members 3 by a pair of spaced parallel horizontally extending support rods 7. A threaded shaft 8 operated by a hand wheel 9, extends through one of the housing side frame members 3, and is operatively connected to subframe assembly 6. Rotation of hand wheel 9 will move subassembly 6 transversely between side frame members 3, as indicated by arrow A in FIG. 3. This enables subframe assembly 6 to be transversely adjusted between the side frame members of the housing with respect to a longitudinal axis 10 of housing 2 which forms a centerline for the path along which a tire tread 12, shown in dot-dash lines in FIG. 3, will move. Tire tread 12 is maintained centered by apparatus 1 as it moves longitudinally toward a usual tire-building drum (not shown) located at the discharge end of the apparatus.

Subframe assembly 6 includes a pair of longitudinally extending side frame members 13 and a top frame member 14 extending therebetween. A top cover 15 preferably is mounted on top frame member 14 to cover the internal mechanism within the housing as a safety feature. A pair of slide rods 17 and 18 extend between and are mounted on frame members 13 in a transverse direction with respect to longitudinal axis 10. A pair of tread guide rail assemblies, which are indicated generally at 20, are movably mounted on slide rods 17 and 18, and extend in a spaced parallel relationship longitudinally along the tread guide path on opposite sides of longitudinal axis 10.

Figure 3:
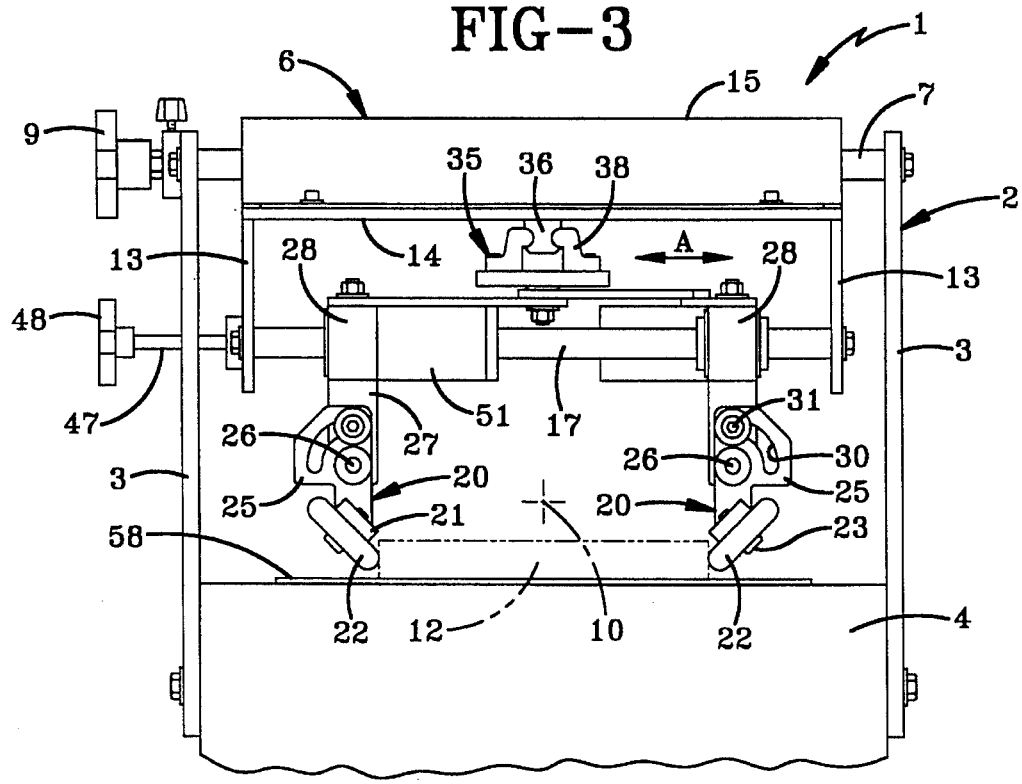
FIG. 3 is a fragmentary front elevational view of the tread guide of FIG. 2, with a tread being shown in dot-dash lines.

Each guide rail assembly 20 includes a guide rail 21 and a plurality of guide rollers 22, which are rotatably mounted thereon by pins 23. Rollers 22 are spaced longitudinally along the guide rail for engagement with the edges of a tread strip, as shown in FIG. 3. Each guide rail 21 is adjustably mounted by front and rear mounting brackets 25. Each bracket 25 is pivotally mounted by a bolt 26 on the lower end of a support plate 27 (FIG. 3).

Plates 27 are secured to bearing blocks 28 through which shafts 17 and 18 extend for movably mounting guide rails assemblies 20 thereon. An arcuate slot 30 is formed in each of the guide rail mounting brackets 25 through which an adjustment bolt 31 extends for clamping bracket 25 in an adjusted angular position, as can be seen in FIG. 3, for changing the angle of engagement of rollers 22 with the side edges of a tread strip 12 to compensate for various thicknesses and sizes of the tread material. Once brackets 25 and rollers 22 are placed in the desired position by rotating brackets 25 about pivot bolts 26, bolts 31 are tightened to secure the brackets in their adjusted position on mounting plates 27.

Figure 4:
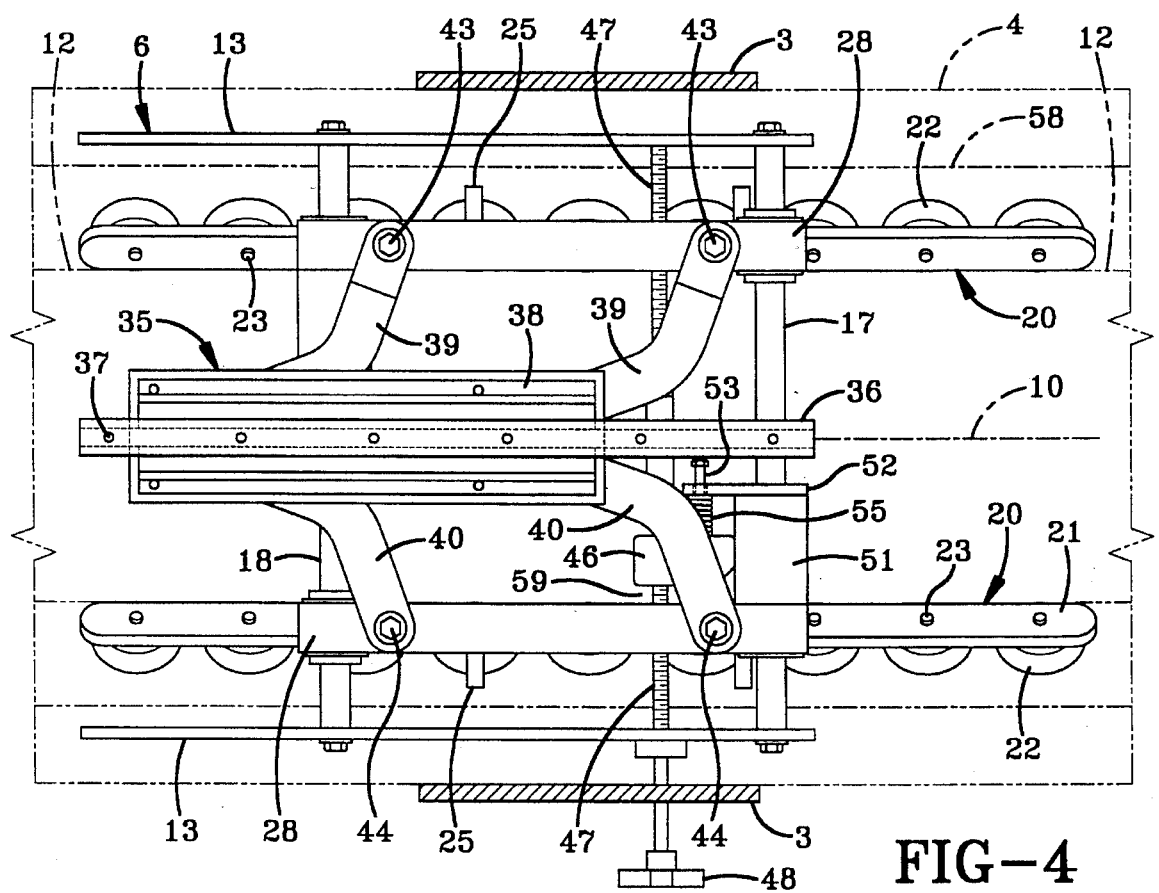
FIG. 4 is a fragmentary sectional view taken on line 4—4, FIG. 2.
Figure 5:
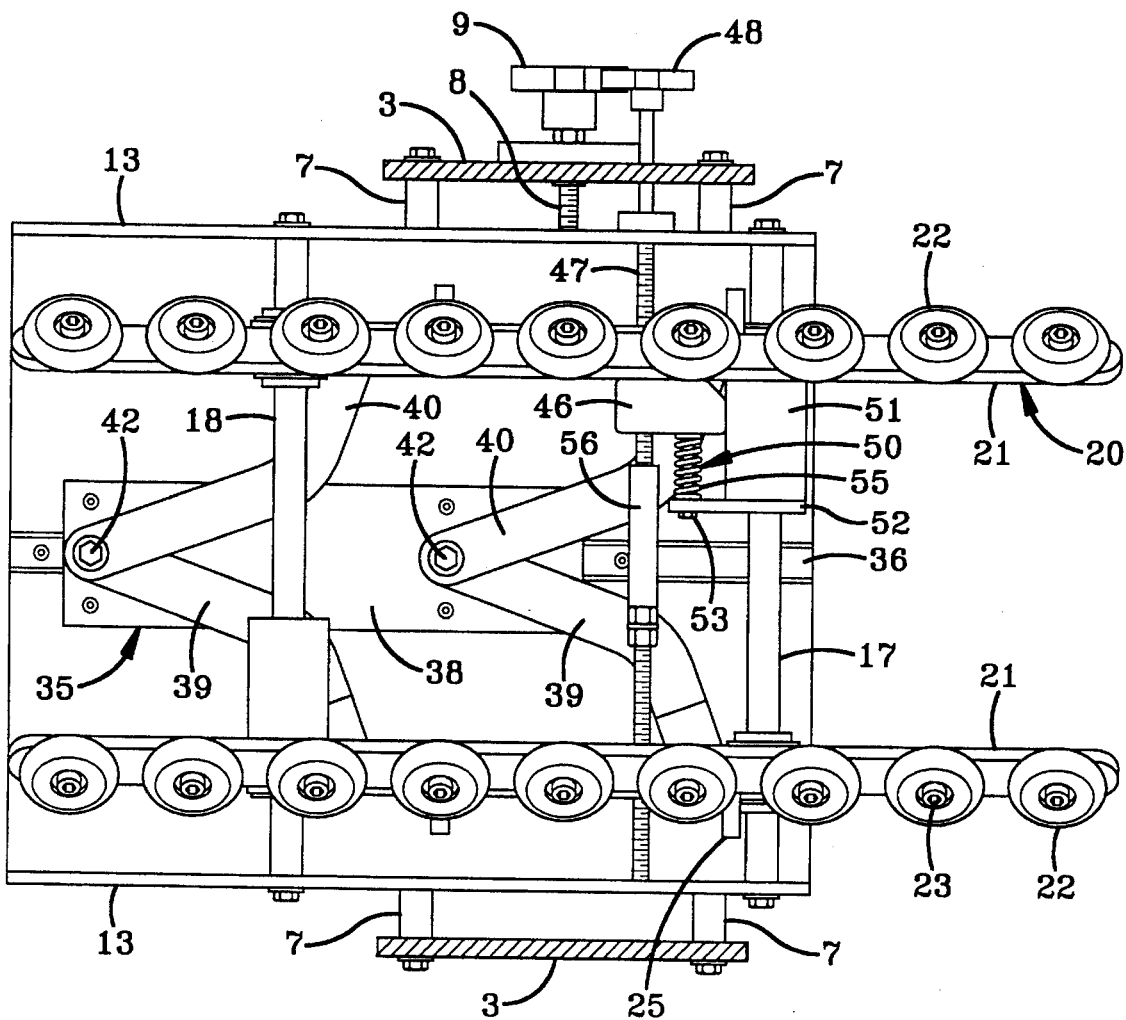
FIG. 5 is a fragmentary sectional view taken on line 5—5, FIG. 2.
Figure 6:
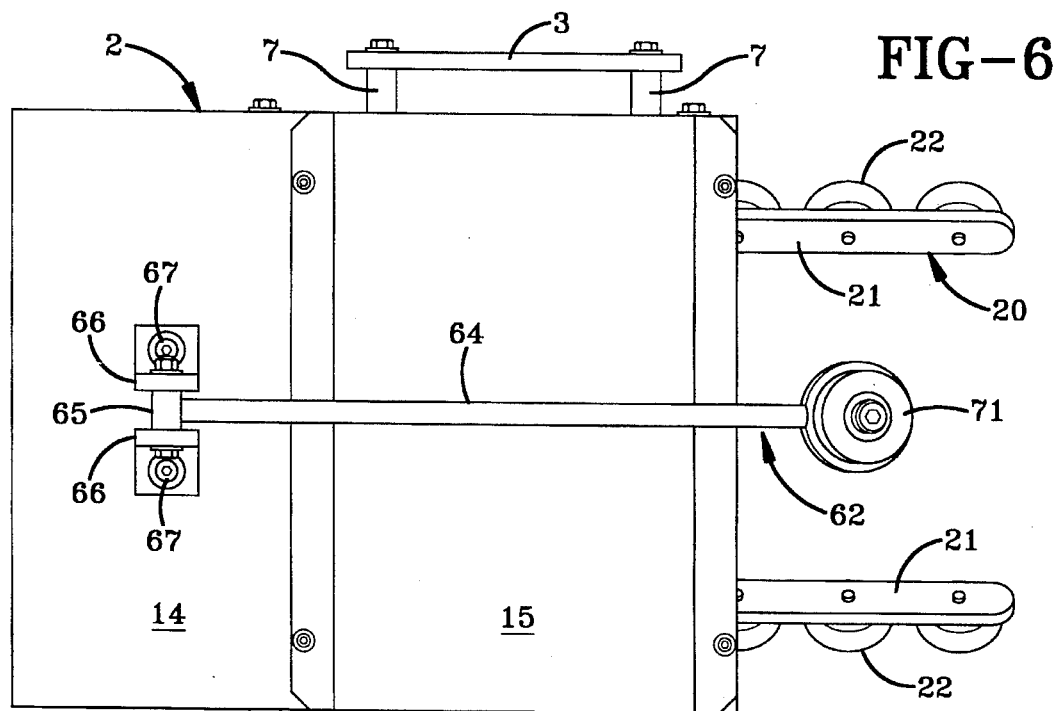
FIG. 6 is a top plan view of a second embodiment of the tread guide apparatus of the present invention.
Figure 7:
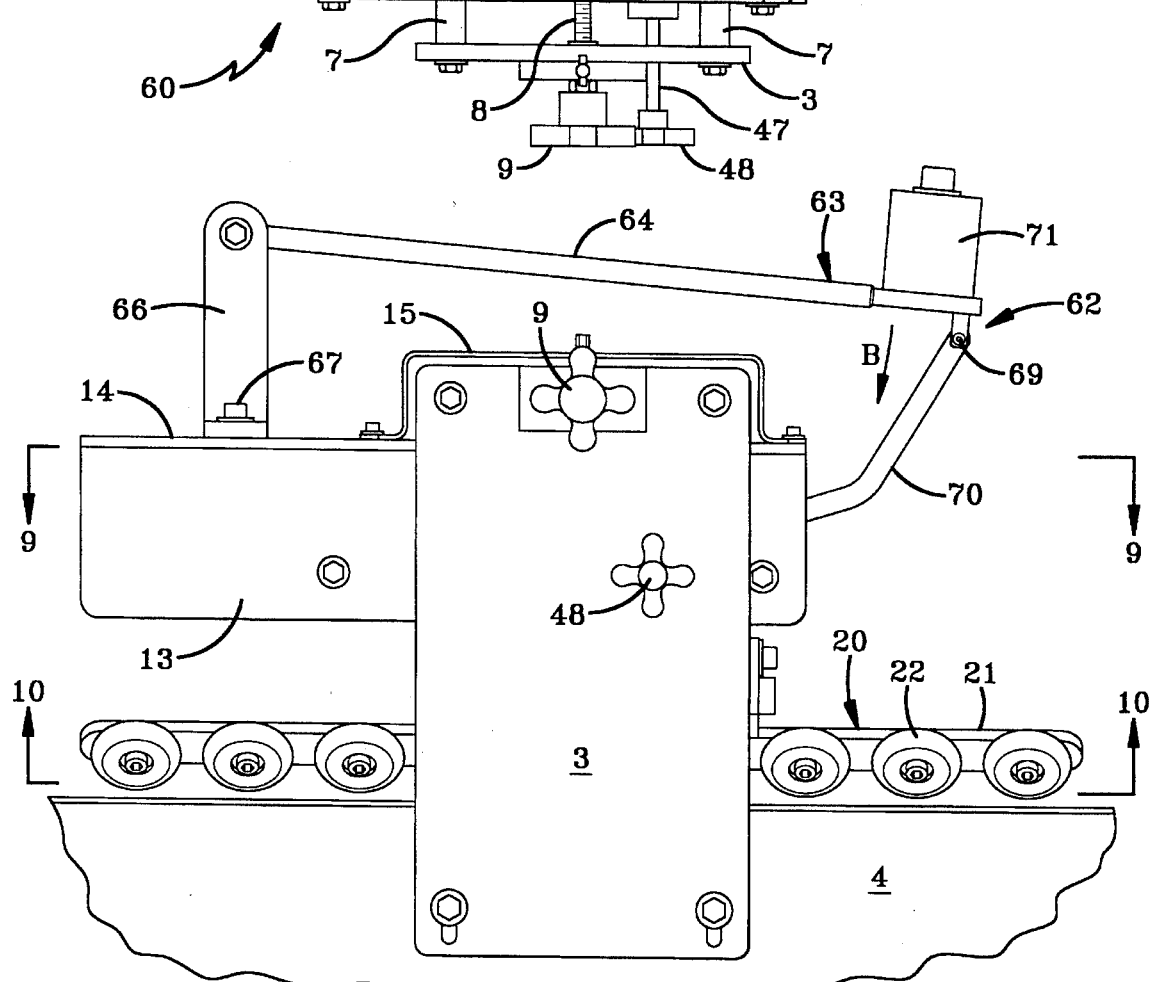
FIG. 7 is a fragmentary side elevational view of the tread guide of FIG. 6 with portions removed.
Figure 8:
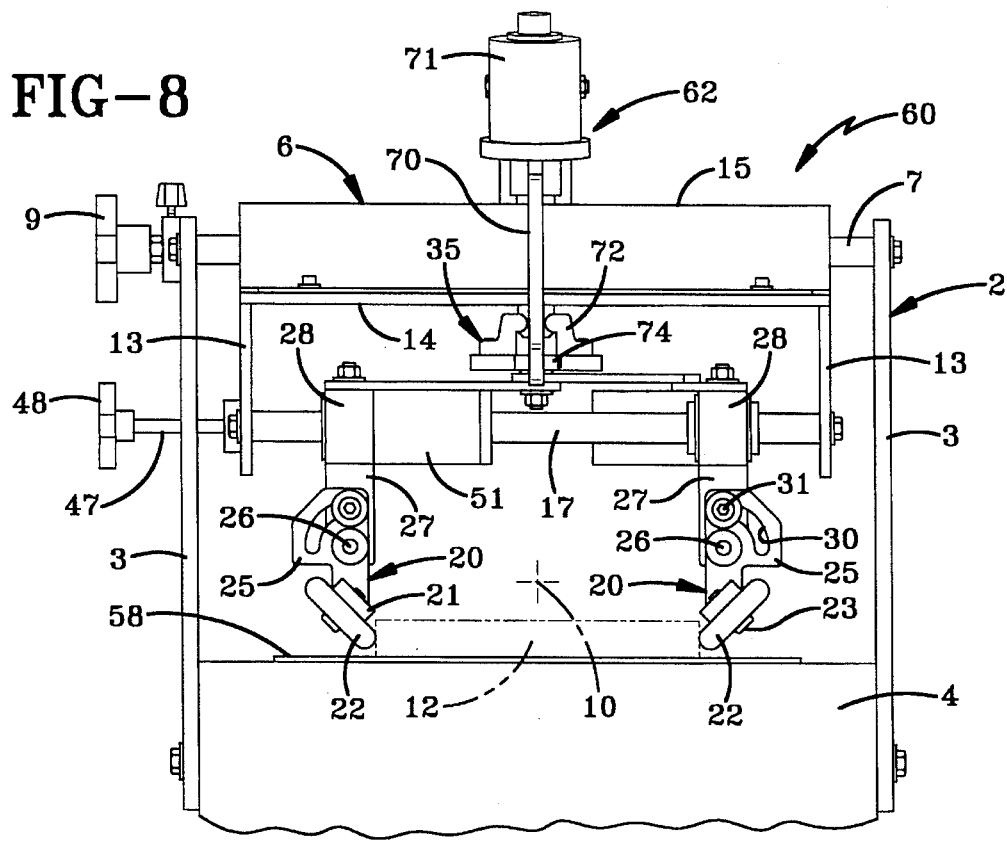
FIG. 8 is a fragmentary front elevational view of FIG. 7, with a tread being shown in dot-dash lines.

As shown particularly in FIGS. 3, 4 and 5, a panograph linkage assembly, indicated generally at 35, is movably mounted on housing 2, and particularly on subframe assembly 6. Linkage assembly 35 is operatively engaged with guide rail assemblies 20 for simultaneous movement of the rail assemblies toward and away from each other to automatically compensate for variations in the width of tread 12. Linkage assembly 35 includes a slide rail 36 which is mounted by a plurality of bolts 37 to top frame member 14 and extends longitudinally therealong, coinciding with longitudinal axis 10. A slide block or plate 38 is slidably mounted on slide rail 36. Two pair of link arms 39 and 40 have inner ends pivotally mounted on slide block 38 (FIG. 5) by pivot bolts 42. The outer ends of link arms 39 and 40 are pivotally mounted by bolts 43 and 44, respectively (FIG. 4), to a respective guide rail assembly 20. Panograph linkage assembly 35 provides for the simultaneous inward and outward movement of guide rail assemblies 20 upon any force being applied to one of the rail assemblies, thus maintaining the individual guide rails at an equal transverse distance from longitudinal axis 10 or the centerline of slide rail 36 and slide block 38.

An adjustment block 46 is formed with an internally threaded hole (not shown) through which a threaded adjustment shaft 47 extends and is threadably engaged therewith for moving block 46 along the shaft upon rotation of the shaft. Shaft 47 extends transversely between side frame members 13 and through one of the outer side frame members 3, and is rotatably controlled by a hand wheel 48. Shaft 47 and block 46 are not connected directly to either guide rail 21.

In accordance with one of the features of the invention, a biasing mechanism, indicated generally at 50, is mounted on slide rod 17 and is operatively engaged with adjustment block 46. Biasing mechanism 50 includes a mounting block 51 which has internal bearings (not shown) for freely slidably mounting it on slide rod 17, and has a mounting bracket 52 attached to block 51 and extending longitudinally therefrom. Block 51 is secured by bolts or other attachment means to adjacent guide rail 21. A bolt 53 extends through an opening formed in bracket 52 and is secured to adjustment block 46. A compression coil spring 55 is mounted on bolt 52 and is trapped between adjustment block 46 and bracket 52 (FIGS. 4 and 5). A stop 56 is mounted in a fixed position at the center of shaft 47 to engage adjustment block 46, limiting the inward travel thereof to prevent damage to the guide rail assemblies and the panograph mechanism.

The operation of tread guide apparatus 1 and its set-up is as follows. The tire tread or other tire-building strip material is placed on a slide plate 58 or other portion of server 4 between guide rollers 22. Prior to the placement of tread 12 between the guide rollers, subframe assembly 6 is centered with respect to longitudinal axis 10 by the rotation of shaft 8 and hand wheel 9. Hand wheel 48 is then rotated, rotating shaft 47, moving block 46 inwardly toward axis 10, which pushes on spring 55, bringing with it slide block 51, mounting bracket 52, and the attached guide rail assembly 20. This inward movement of the attached guide rail assembly will cause the opposite guide rail assembly 20 to move toward axis 10 and tread strip 12 by the connections to linkage assembly 35. Shaft 47 is rotated until the rollers 22 are in abutting relationship with the edges of tread 12, as shown in FIG. 3. Then shaft 47 is rotated several more turns, which will compress spring 55, causing a gap 59 to appear between adjustment block 46 and its connected guide rail 21 which places tension on the tread by the spring-biased rollers 22. Should the tread get narrower during the tire-building process, the tension of spring 55 will move the guide rollers toward each other simultaneously in unison through linkage assembly 35, keeping constant pressure on the tread and, most importantly, keeping the tread centered with respect to axis 10, which, in turn, aligns the tread with an adjacent tire-building drum. Should the tread get wider during the tire-building process, the guide rollers move outwardly, causing the spring to be compressed, again moving both guide rails in unison in an equal transverse direction with respect to axis 10, to maintain the tread centered therebetween.

A second embodiment of the improved tread guide apparatus is indicated generally at 60, and is shown in FIGS. 6–10. Many of the same components and mounting arrangements of apparatus 60 are the same as apparatus 1, and, therefore, are not described in detail with the same numbers being used to represent similar parts.

Figure 9:
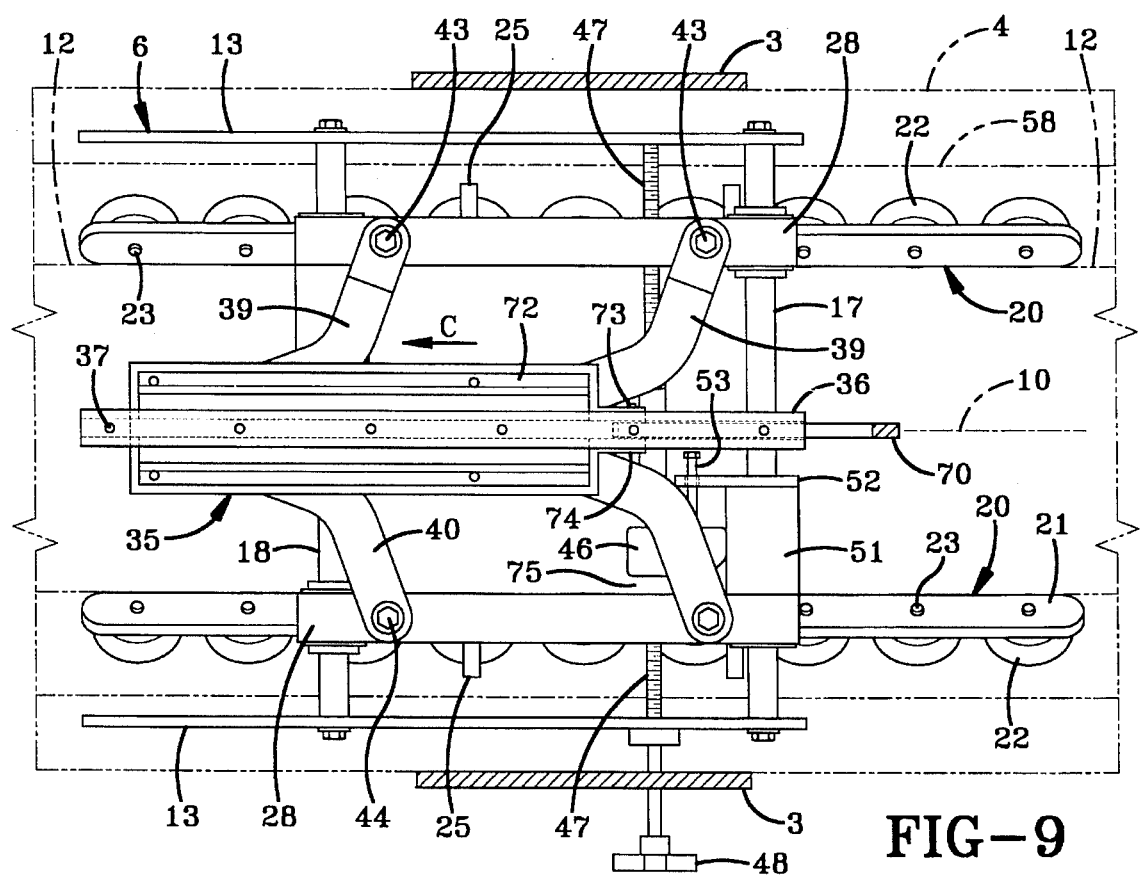
FIG. 9 is a fragmentary sectional view taken on line 9—9, FIG. 7.
Figure 10:
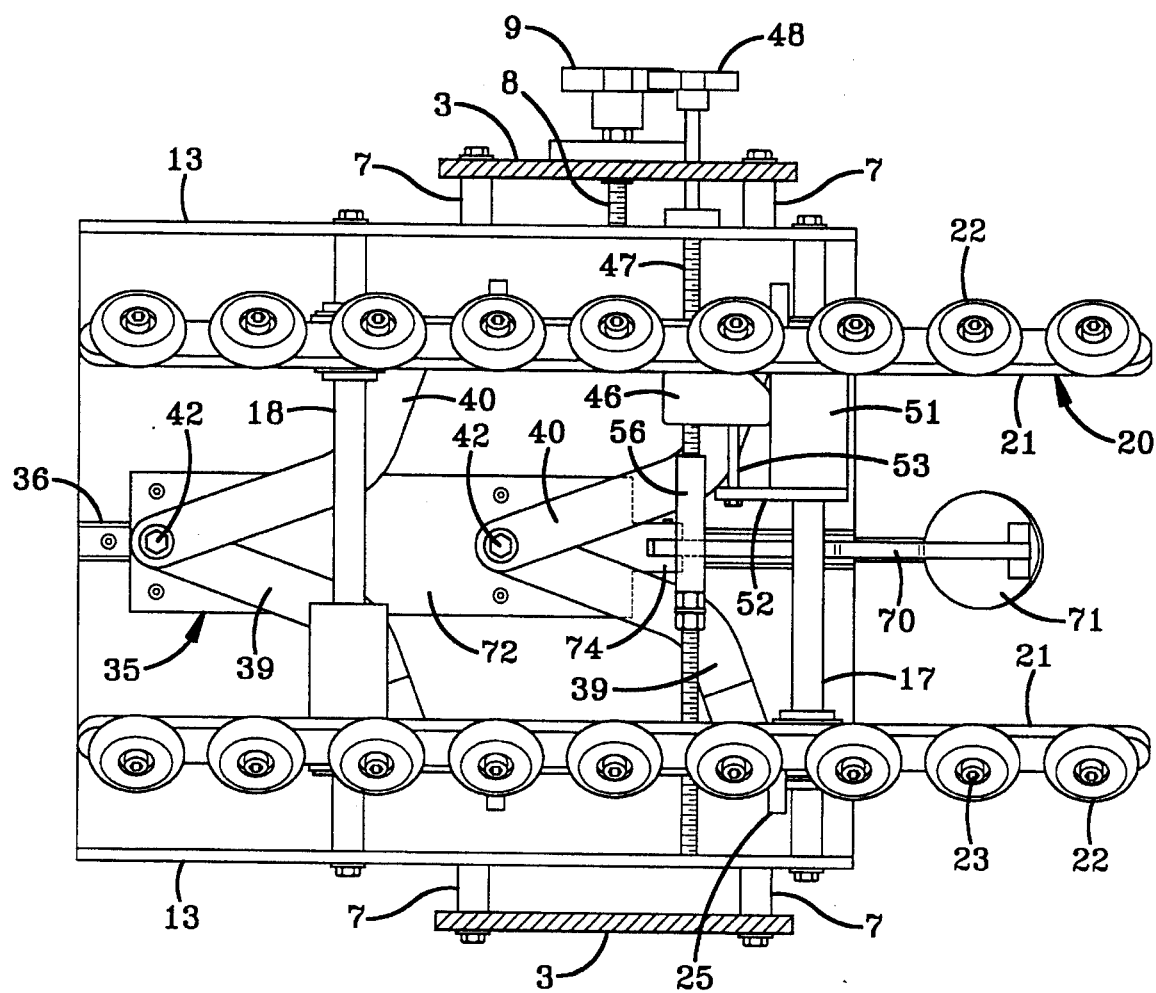
FIG. 10 is a fragmentary sectional view taken on line 10—10, FIG. 7.

The main difference between apparatus 60 and apparatus 1 is the use of a different biasing mechanism, indicated generally at 62, replaces spring-biasing mechanism 50 of apparatus 1. Biasing mechanism 62 includes a weight-actuated mechanism, replacing compression coil spring 55. Biasing mechanism 62 includes an articulated lever, indicated generally at 63, which includes first and second lever arms 64 and 70, respectively. Lever arm 64 is pivotally mounted at one end by a pivot shaft 65 which extends between a pair of upstanding spaced brackets 66, which are bolted to top frame member 14 by bolts 67. The distal end of lever arm 64 is pivotally connected by a pin 69 to the end of second lever arm 70. The opposite end of lever arm 70 from pivot pin 69 is connected to a modified slide block 72 (FIGS. 9 and 10), which is slidably mounted on slide rail 36 in a similar manner as is slide block 38 of apparatus 1. Lever arm 70 is preferably attached to slide block 72 by a bolt 73 which extends between a pair of yoke arms 74, between which the end of lever arm 70 extends (FIG. 9).

A weight 71 is mounted on articulated lever 63, preferably adjacent the distal end of first lever arm 64. Weight 71 presses downwardly on lever arm 70, as shown by arrow B in FIG. 7, which moves slide block 72 rearwardly in the direction of arrow C (FIG. 9), which, in turn, through panograph linkage assembly 35, biases guide rail assemblies 20 transversely inwardly toward longitudinal axis 10. Thus, weight 71 provides a constant inwardly biasing force on rollers 22 against the side edges of a tread strip 12 or other tire-building strip material. Adjustment block 46 when moved inwardly along threaded shaft 47 serves as a stop, limiting the inward movement of rail assemblies 20 when used with weight-biasing mechanism 62. Previously discussed stop 56 may remain on shaft 47 or be removed, if desired, without affecting the operation of apparatus 60, since it no longer performs any function due to the presence of block 46. Spring 55 is removed from bolt 53, which will continue to pass through the opening formed in block 46.

After a tread has been placed on the server between the guide rollers, shaft 47 is rotated so that it moves the block 46 toward the center of the guide apparatus. Weight 71 pushes on slide block 72, causing guide rollers 22 to move inwardly as block 46 is advanced inwardly by the rotation of shaft 47. When the shaft has been rotated far enough so that guide rollers 22 touch the tread on both sides, the shaft will be rotated several more turns. This moves threaded stop block 46 inwardly away from the guide rail to form a gap 75 therebetween, as shown particularly in FIGS. 9 and 10. This inward movement of block 46 will not affect slide block 51, since bolt 53 passes freely through the enlarged hole in the end of bracket 52 and spring 55 has been removed. Thus, upon the tread getting narrower during the tire-building process, weight 71 will force the guide rollers inwardly simultaneously together against the side edges of tread 12, maintaining it centered along axis 10. If the tread should get wider during the tire-building process, the guide rollers will move out, lifting the weight but still maintaining pressure on the edges of the tread to maintain it on center.

Accordingly, the improved tread guide apparatus of the present invention provides a simple mechanism for maintaining the tread moving through the guide apparatus along a predetermined center line to enable the tread or other tire-building strip material to be placed accurately on an adjacent tire-building drum, even though variations in strip width occur during longitudinal movement of the strip toward the tire-building drum. Use of a weight-biasing mechanism may have some advantages over a spring-biasing mechanism in that it provides no variable spring characteristics as in common with most springs, and maintains a nearly constant force on the side edges of the strip material.

Accordingly, the guide for tire-building machines of the present invention is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved guide for tire-building machines is constructed and used, the characteristics of the construction, and the advantageous, new and useful results obtained; the new and useful structures, devices, elements, arrangements, parts and combinations, are set forth in the appended claims.

I claim:

1. In a strip-centering guide for tire-building machines, said strip guide including:

a support housing having a longitudinal material path extending therethrough;

a pair of support rods mounted on the housing and extending transversely across the longitudinal material path;

a pair of spaced longitudinally extending guide rails movably mounted on the support rods and connected together for simultaneous movement toward and away from each other only in a transverse direction with respect to the longitudinal path of the support housing;

guide means mounted on each of the guide rails for guiding engagement with a strip of tire-building material moving longitudinally between the guide rails;

linkage means including a panograph having a slide block longitudinally slidably mounted on the housing and two pairs of link arms pivotally mounted at first ends to the slide block and at second ends to the guide rails for moving the guide rails toward and away from each other on the support rods; and biasing means operatively engageable with the guide rails for biasing the rails toward each other and for moving the guide means into engagement with a strip of material moving between said rails to maintain said strip centered within the housing as it moves therethrough, said biasing means including a spring and an adjustment block adjustably mounted on the housing and engaged by the spring for automatically adjusting the transverse spacing between the pair of guide rails dependent upon the width of the strip; and means for adjusting the position of said adjustment block with respect to the housing.

2. A guide as defined in claim 1 in which the housing includes a pair of spaced-apart side frame members; and in which the pair of support rods extend transversely between said frame members.

3. A guide as defined in claim 2 includes means for adjustably mounting the side frame members on the housing.

4. A guide as defined in claim 2 in which the adjustment block is movably mounted on a threaded shaft which extends transversely between the housing side frame members.

5. A guide as defined in claim 4 in which the means for adjusting the position of the adjustment block includes a manually operated hand wheel for rotating the threaded shaft.

6. A guide as defined in claim 4 including a stop mounted on the shaft and engageable with the adjustment block to limit the inward movement of the guide rails.

7. A guide as defined in claim 1 in which a slide rail is mounted on the housing and extends along a longitudinal axis of the material path; and in which the slide block of the linkage means is slidably mounted on the slide rail.

8. A guide as defined in claim 1 in which the housing includes material support means located beneath the guide means for supporting and moving the material along the material path, said support means being independent of the guide rails and spaced therefrom.

9. In a strip guide for tire-building machines, said guide including:

a support housing having a longitudinal material path therethrough;

a pair of spaced longitudinally extending guide rails connected together for simultaneous movement toward and away from each other only in a transverse direction with respect to the longitudinal path of the support housing;

guide means mounted on each of the guide rails for guiding engagement with a strip of tire-building material moving longitudinally between the guide rails;

a panograph having a slide rail mounted on the housing and extending along the material path and a slide block slidably mounted on the housing and having two pairs of link arms pivotally mounted at first ends to the slide block and at second ends to the guide rails;

a lever pivotally mounted on the housing and connected to the slide block; and a weight mounted on the lever for biasing the slide block along the slide rail in a direction which moves the guide rails toward each other to move the guide means into engagement with the strip of material moving between the rails to maintain said strip centered within the housing.

10. A guide as defined in claim 9 in which the articulated lever includes first and second lever arms; in which the first lever arm is pivotally connected at a first end to the housing and at a second end to a first end of the second lever arm; in which a second end of the second lever arm is connected to the slide block; and in which the weight is mounted on the articulated lever adjacent the pivotal connection between the first and second lever arms.

11. A guide as defined in claim 9 in which the guide means is a plurality of rollers rotatably mounted in a spaced relationship on the guide rails.

12. A guide as defined in claim 11 including adjustment means for adjustably mounting the guide rails and rollers.

13. A guide as defined in claim 9 in which the housing includes material support means located beneath the guide means for supporting and moving the material along the material path, said support means being independent of the guide rails and spaced therefrom.

* * * * *